United States Patent [19]

Songer

[11] Patent Number: 5,757,436
[45] Date of Patent: May 26, 1998

[54] IMAGE PROCESSOR SYSTEM

[75] Inventor: Jimmie D. Songer, Burleson, Tex.

[73] Assignee: Magma, Inc., Fort Worth, Tex.

[21] Appl. No.: 667,550

[22] Filed: Jun. 21, 1996

[51] Int. Cl.$^6$ .............................. H04N 7/01; H04N 11/20; H04N 7/04

[52] U.S. Cl. .................. 348/470; 348/447; 348/448; 348/457; 348/458; 348/613

[58] Field of Search .................. 348/447, 448, 348/457, 458, 459, 443, 715, 714, 613, 608, 470; H04N 7/01, 11/20, 7/04

[56] References Cited

U.S. PATENT DOCUMENTS

| | | | |
|---|---|---|---|
| 4,091,414 | 5/1978 | Chow | 358/174 |
| 4,628,362 | 12/1986 | Waehner | 358/174 |
| 5,225,910 | 7/1993 | Sugimori et al. | 358/167 |
| 5,227,883 | 7/1993 | Dischert et al. | 358/160 |
| 5,299,002 | 3/1994 | Funayama | 348/607 |
| 5,386,249 | 1/1995 | Strolle et al. | 348/701 |
| 5,402,179 | 3/1995 | Okada | 348/607 |
| 5,486,874 | 1/1996 | Songer | 348/600 |
| 5,598,225 | 1/1997 | Songer | 348/711 |

*Primary Examiner*—John K. Peng
*Assistant Examiner*—Vivek Srivastava
*Attorney, Agent, or Firm*—David B. Newman, Jr.; Suzin C. Bailey

[57] ABSTRACT

An image-processor system for compensating for accumulated phase-and-gain errors incurred during transmission of a video signal over a communications channel. The image-processor system comprises an initial-video processor, an input-video processor, a feature-video processor, a frame buffer, an RGB-output processor, an output-video processor, and a control processor. The initial-video processor generates a composite video signal. The input-video processor converts the composite video signal into digital-component signal information. The feature-video processor processes the digital-component signal information as processed component video information. The frame buffer re-establishes broadcast timing standards in the processed component video information to generate time-base corrected digital information. The RGB-output processor decodes the time-base corrected digital information into RGB analog and digital outputs. The analog RGB outputs are output directly. The output-video processor reconstructs the digital RGB outputs into an analog-composite video-signal format and an analog-component video signal component. The control processor loads and updates the parameters used by the input-video processor, the feature-video processor, and the output-video processor in processing the composite video signal.

23 Claims, 8 Drawing Sheets

IMAGE PROCESSOR SYSTEM

BACKGROUND OF THE INVENTION

This invention relates to color television, more particularly to a process and apparatus for improving the structure of the video signal, which can be updated by a processor with parameters stored in a memory.

DESCRIPTION OF THE RELEVANT ART

The National Television System Committee (NTSC) commercial-broadcast standard is used in the United States and other countries. The NTSC-standard video signal consists of a high-frequency-wideband-luminance component and simultaneous-chrominance components on a reduced subcarrier for overall-bandwidth conservation. In the NTSC standard, the monochrome image is the basic structural element of the color image. For a color image, coarser-image elements convert the monochrome image into a color image. The high-frequency luminance information is applied equally to each color channel.

The chrominance information components, R-Y or B-Y, occupy approximately 1 MHz ±0.5 MHz of bandwidth, while the luminance-information component, Y, is maintained at approximately 4 MHz of bandwidth. Thus the chrominance components, R-Y and B-Y, cannot carry as many pixels as can the luminance component, Y.

Signal distortion and the resulting degradation of the video image is the result of changes in the waveform occurring in a transduction or transmission medium. The principal sources of signal distortion are the relation between input and output at a given frequency, non-uniform transmission at different frequencies, and phase shift related to frequency. These sources may be particularly severe in transmission lines, such as cable, and transmitter radio frequency (RF) and receiver RF stages. These sources also can occur in video-recording equipment.

Signal degradation occurs to a video signal when a multiple-bandwidth modulated carrier having R-Y, B-Y, and Y components, utilizing different bandwidths for each component, meets capacitive, resistive, or inductive reactance. The capacitive, resistive, or inductive reactance affects the different components in the carrier signal, causing differential phase-and-gain errors between the three components. The corruption of the various components of the signal varies inasmuch as the components, themselves, vary within the signal.

Further distortion accumulates in editing, production, and post production. Errors also develop during recording and playback.

Many solutions have been advanced for enhancing the video image by correcting these problems within the normal circuitry of a color-television receiver, either direct view or projection. In most cases the solutions are applied to the signal as it enters the receiver without regard to the corruption the signal has encountered in the transmission and reception processes.

Among the many solutions offered in the prior art are re-establishing a predetermined-phase relationship of a chrominance component with a reference, generating a variety of correction signals which are then added to the video signal, delaying two lines of a signal and adding the interpolation of the chrominance component back into the first signal, and improving the response by adding a high-frequency luminance component determined by proportions of various transitions of the chrominance component. These solutions, however, typically engender motion matrix problems.

SUMMARY OF THE INVENTION

A general object of the present invention is an image-processor system of a composite/Y:C nature which manipulates a signal whereby synchronization, chrominance, and luminance components are combined, gathering pre-delayed I and Q information plus Y information, to correct for video distortion as it relates to time-base correction for uncontrolled picture-group delays, and to reduce amplitude distortion from the video signal.

A further object of the present invention is an image-processor system with controlling software for modifying video-processor parameters based on total distortion received at the image-processor system, and for allowing the user to selectively and interactively modify the processor parameters.

Another object of-the invention is restoring the overall composite information, generating signal correction which restores phase-and-amplitude reference of the composite signal to approximately that of the original signal prior to transmission without changing the bandwidth or the system standards, while avoiding the motion problems of the prior art solutions.

According to the present invention, as embodied and broadly described herein, an image-processor system is provided comprising an initial-video processor and digital-processing means. The digital-processing means includes an input-video processor, a feature-video processor, a frame buffer, an RGB-output processor, an output-video processor, and a control processor.

The initial-video processor compensates for accumulated phase-and-gain errors encountered during transmission of the video signal over a communications channel. The initial-video processor normalizes distorted-input signals by correcting for chrominance-group delays, luminance-group delays, and differential phase-and-gain incurred during the recording and transmission of television signals. In separating a video signal into a luminance component and a chrominance component, the initial-video processor can skew the luminance component and the chrominance component, referenced one to the other, both in time and amplitude, to correct for delay and distortion incurred in transmission.

The initial-video processor includes a high-pass filter-and-amplifier, a postcorrection phase-and-gain restorer, a wideband-video delay line, a precorrection phase-and-gain restorer, and a combining network. The high-pass filter has a bandwidth characteristic which is approximately inverse to a low-pass characteristic encountered by the video signal during its transmission over the communications channel, or during recording and playback on a recording device. The amplifier associated with the high-pass filter inverts the high-pass filtered video signal. The postcorrection phase-and-gain restorer adjusts the inverted-filtered video signal to output a restored video signal.

The wideband-video delay line delays the input video by a half-cycle, or more, at the subcarrier frequency, or chrominance frequency, to generate a delayed video signal. The subcarrier signal is a well known part of the video signal. The subcarrier frequency is the frequency of the subcarrier portion of the video signal. The precorrection phase-and-gain restorer buffers the delayed video signal. The combining network combines the restored video signal and the delayed video signal. The output of the combining network is a composite video signal.

The digital-processing means reshapes and reprocesses the composite video signal to conform to NTSC, PAL or other selected broadcast standard with time-base correction.

The input-video processor converts the composite video signal into digital component-signal information.

The feature-video processor processes the digital component-signal information to contour the video information, reduce noise, and bandpass-equalize the video information into processed component video information.

The frame buffer re-establishes broadcast timing standards such as NTSC, PAL or SECAM in the processed-component video information to generate time-base corrected digital information.

The RGB-output processor converts the time-base corrected digital information to RGB outputs and provides digital RGB signals to the output-video processor and analog RGB signals as direct output.

The output-video processor converts the digital RGB signals into an analog video-signal format such as composite or component.

The control processor provides input to the input-video processor, the feature-video processor, and the output-video processor. The control processor sends code information derived from switches on a front panel or from a software-controlled external computer to enable the digital processor to enhance the output of the initial-video processor. In the absence of switch or computer information, the control processor contains default parameters stored in a hard-coded control-processor memory for use by the input-video processor, the feature-video processor, and the output-video processor.

The image-processor system broadly loads a default set of parameters stored in a hard-coded control-processor memory when power is supplied. The control processor determines which video processors are on-line, i.e., which of the input-video processor, the feature-video processor, or the output-video processor are connected. A set of parameters stored in an electronically erasable programmable read-only memory (EEPROM) is then examined via the control-processor software to determine the validity of the stored parameters. If the parameters are valid, then the stored set of parameters is downloaded to the input-video processor, the feature-video processor, and the output-video processor. If the parameters are not valid, then the input-video processor, the feature-video processor, and the output-video processor continue to function with the default set of parameters.

The user can modify the parameters stored in the EEPROM based on the nature and extent of video distortion as measured with commercially-available test equipment or by the user's judgement. If the new parameters are acceptable, then the new parameters are stored in the control-processor EEPROM or the software-controlled external computer. A "parameter valid" warm-start pattern is written to the control-processor EEPROM and the new parameters are loaded into the input-video processor, the feature-video processor, and the output-video processor.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The present invention broadly provides a novel system and method for improving the image of a television signal at a receiver. An image-processor system may be embodied in discrete electronic components, as an integrated circuit, as a digital-signal processor, as an application-specific integrated circuit, or as any other equivalent circuit providing the same means and performing the same functions as described herein. Using the teachings of the present invention, equivalent circuits and embodiments would be known to those skilled in the art.

The image-processor system has a video input and a video output, with a video signal being applied to the input, and a broadcast-standard video signal in analog form coming from the output. The video signal applied at the input of the image-processor system, is the video signal to be normalized through compensation for accumulated phase-and-gain errors encountered during transmission over a communication channel, during recording and playback of a video recorder, or during equivalent processes which represent potential sources of signal distortion. The accumulated phase-and-gain errors may be due to bandwidth effects as the video signal, modulating a radio-frequency (RF) carrier signal, passes through a cable or transmission line, RF circuitry of a transmitter, or circuitry in the front end of a receiver. Typically, a cable, a transmission line, or a front end of a receiver has a low-pass frequency characteristic which tends to limit the amount of the video signal being passed therethrough.

The image-processor system broadly comprises an initial-video processor and digital-processing means. The digital-processing means includes an input-video processor, a feature-video processor, a frame buffer, an RGB-output processor, an output-video processor, and a control processor. The initial-video processor is coupled between the input and the input-video processor. The feature-video processor is coupled between the input-video processor and the frame buffer. The RGB-output processor is coupled between the frame buffer and the output-video processor. The output-video processor is coupled to the video output. The control processor is coupled to the input-video processor, the feature-video processor, and the output-video processor. These processors are discussed in turn, under respective headings.

Initial-Video Processor

The initial-video processor normalizes distorted-input signals by correcting for chrominance-group delays, luminance-group delays, and differential phase-and-gain errors incurred in recording and transmitting television signals. The initial-video processor is fully described in U.S. Pat. No. 5,486,874, which is hereby incorporated by reference.

The initial-video processor includes high-pass filter-and-amplifier means, postcorrection phase-and-gain restorer means, delay means, precorrection phase-and-gain restorer means, and combiner means. The high-pass filter-and-amplifier means is coupled between the input of the image-processor system, and postcorrection phase-and-gain restorer means. The delay means is coupled between the input of the image-processor system and the precorrection phase-and-gain restorer means. The postcorrection phase-and-gain restorer means and the precorrection phase-and-gain restorer means are coupled to combiner means.

The high-pass filter-and-amplifier means is for filtering a video signal. The high-pass filter-and-amplifier means has a bandwidth characteristic which preferably is inverse to the low-pass characteristic encountered during transmission of the video signal over the communications channel, or during recording and playback of the video signal in a video recorder. As used herein, the low-pass characteristic includes those effects encountered through the transmission medium, such as cable, transmission lines, and other types of channels, and the input circuit of the receiver, or equivalent effects in a video recorder. Ideally, the high-pass filter-and-amplifier means has an amplitude-versus-frequency response which is a reverse curve of the effects encountered by the video signal. The high-pass filter-and-amplifier means pre-equalizes the video signal in an inversely proportional mode.

The high-pass filter-and-amplifier means inverts the filtered video signal. The high-pass filter-and-amplifier means typically phase-shifts the filtered video signal by 180 degrees. The output of the high-pass filter-and-amplifier means is denoted herein as an inverted-filtered video signal.

The postcorrection phase-and-gain restorer means adjusts the lost gains and prephases the delayed-group information of the inverted-filtered video signal to the restored-signal level. The output signal from the postcorrection phase-and-gain restorer means is denoted herein as a restored video signal.

The delay means delays the video signal from the input by an odd-integer multiple of a half-cycle, or more, at the subcarrier frequency to match chroma-path delays. Preferably, the delay means delays the video signal by at least a half-cycle at the subcarrier frequency. The output of the delay means is denoted herein as a delayed video signal.

The precorrection phase-and-gain restorer means adjusts the delayed video signal to the restored-signal level. The output of the precorrection phase-and-gain restorer means is a restored delayed video signal. By having the inverted-filtered video signal and the delayed video signal amplified to the restored-signal level, compensation is more easily effected at the combiner means.

The combiner means combines the restored video signal and the restored delayed video signal to generate a composite video signal. The composite video signal includes the effects of the restored video signal and the delayed video signal.

Figure 1:
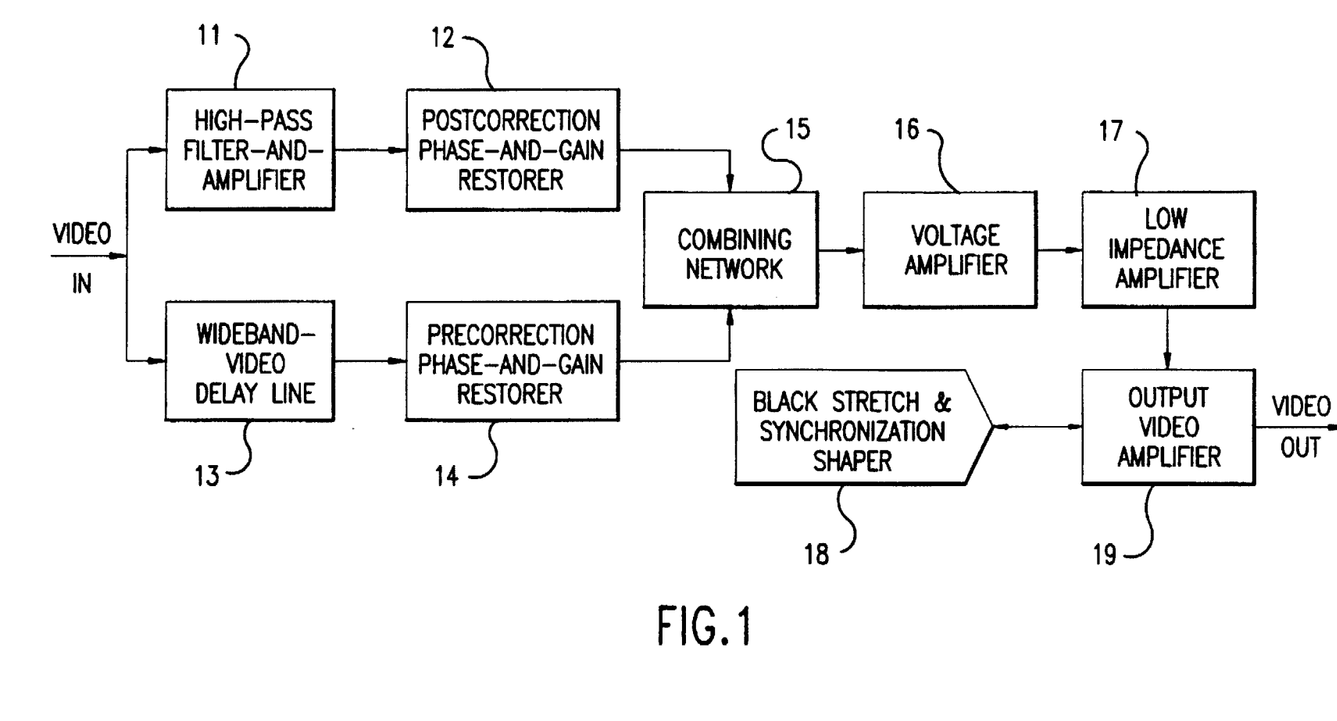
FIG. 1 shows a block diagram of the initial-video processor of the present invention.

In the exemplary arrangement of the initial-video processor shown in FIG. 1, the high-pass filter-and-amplifier means is embodied as a high-pass filter-and-amplifier 11, the postcorrection phase-and-gain restorer means is embodied as a postcorrection phase-and-gain restorer 12, the delay means is embodied as a wideband-video delay line 13, the precorrection phase-and-gain restorer means is embodied as a precorrection phase-and-gain restorer 14, and the combiner means is embodied as a combining network 15. The precorrection phase-and-gain restorer means may also be embodied as a precorrection comb-equalizer restorer or as an amplifier having a gain of one for buffering the delayed video signal. The high-pass filter-and-amplifier 11 is coupled between the video input and the postcorrection phase-and-gain restorer 12. The wideband-video delay line 13 is coupled between the video input and the precorrection phase-and-gain restorer 14. The combining network 15 is coupled to the postcorrection phase-and-gain restorer 12 and to the precorrection phase-and-gain restorer 14.

The circuitry of the initial-video processor may further include a voltage amplifier 16 coupled to the output of the combining network 15, and low-impedance amplifier 17 coupled to the output of the voltage amplifier 16. Additionally, a black-stretch and synchronization shaper 18 may be coupled for controlling an output-video amplifier 19. The output-video amplifier 19 is coupled to the low-impedance amplifier 17 and to the video output.

The combining network 15 outputs a composite video signal. The voltage amplifier 16 amplifies the composite video signal, and the low-impedance amplifier 17 matches an impedance output of the voltage amplifier 16 to the output-video amplifier 19. The output-video amplifier 19 outputs the composite video signal.

Figure 2:
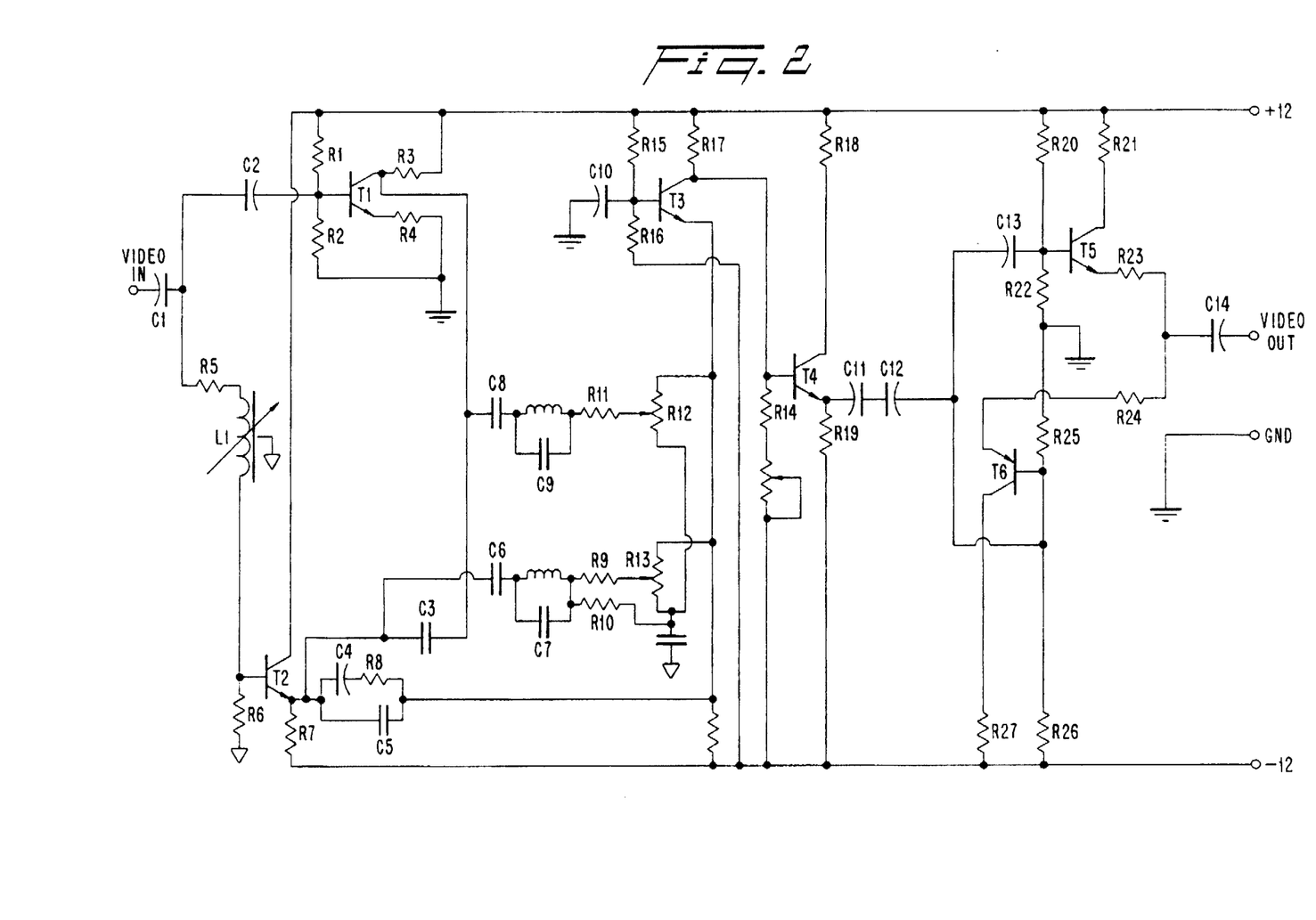
FIG. 2 is a circuit diagram of the initial-video processor of FIG. 1.

The high-pass filter-and-amplifier 11 has a bandwidth characteristic inverse to a low-pass characteristic encountered during transmission over the communications channel or during recording and playback in a recording device. Referring to FIG. 2, the high-pass filter-and-amplifier 11 may be embodied as capacitor C2 and transistor T1. For an NTSC signal, the capacitor C2 might be a fifty-picofarad capacitor. The high-pass filter-and-amplifier 11 typically has a reactance which decreases 6 dB per octave. The transistor T1 inverts the high-pass filtered video signal from the capacitor C2.

As shown in FIG. 2, a class A amplifier working in a linear part of a characteristic curve may serve as part of the high-pass filter-and-amplifier 11. The high-pass filter-and-amplifier 11 includes transistor T1, with biasing resistors R1 and R2. Additionally, collector resistor R3 and emitter resistor R4 serve to bias the transistor T1 into the linear part of its characteristic curve.

The postcorrection phase-and-gain restorer 12 restores a signal level of the inverted-filtered video signal. The output of the postcorrection phase-and-gain restorer 12 is the restored video signal. The postcorrection phase-and-gain restorer 12 may be embodied as a resistor R12, which can adjust the signal level of the inverted-filtered video signal.

The wideband-video delay line 13 delays the video signal by an odd-integer multiple of a half-cycle, or more, at the subcarrier frequency. Preferably, the wideband-video delay line 13 delays the video signal by a half-cycle, or more, at the subcarrier frequency. As shown in FIG. 2, the wideband-video delay line 13 is embodied as delay line L1 coupled through resistor R5 and coupling capacitor C1 to the input.

A buffer circuit may buffer the delayed video signal from the output of the wideband-video delay line 13. As shown in FIG. 2, the buffer may be embodied as a transistor T2 coupled to base resistor RG, and emitter resistor R7. Transistor T2 is shown as an emitter-follower circuit, having a gain of approximately one.

The precorrection phase-and-gain restorer 14 restores a signal level of the delayed video signal to the restored-signal level. In FIG. 2, the precorrection phase-and-gain restorer 14 is embodied as resistor R13, which adjusts the signal level of the delayed video signal.

The combining network 15 combines the restored video signal and the delayed video signal. The output of the combining network 15 is the composite video signal. The combining network 15 is shown in FIG. 2 as resistor R11, R12, R9, R13, coupled to the emitter of transistor T3. Coupling capacitor C8 couples the postcorrection phase-and-gain restorer to the output of transistor T1, and the capacitor C6 couples the precorrection phase-and-gain restorer to transistor T2. Inductor L2 and capacitor C9 filter the restored video signal. Inductor L3 and capacitor C7 filter the delayed video signal.

The voltage amplifier 16 is shown as transistor T3. Transistor T3 has biasing resistors R15, R16, and collector resistor R17.

The low-impedance amplifier 17 is shown as transistor T4 with its base connected to the collector of transistor T3. Transistor T4 is an emitter-follower circuit, and serves as a low-impedance amplifier.

Figure 3:
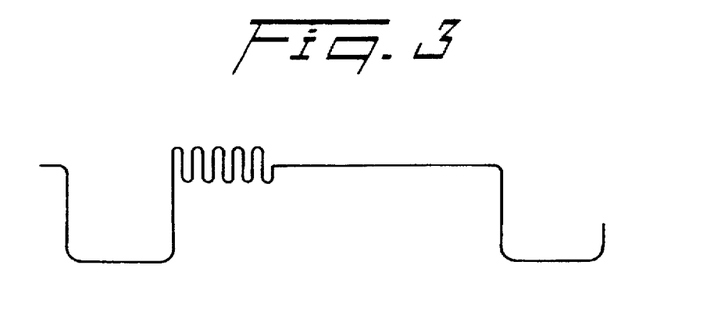
FIG. 3 is a drawing of a corrupted waveform.

As illustratively shown in FIG. 1, a NTSC video signal is received by the initial-video processor from any source and the video input passes to a high-pass filter-and-amplifier 11, while simultaneously being diverted to a wideband-video delay line 13. A corrupted video signal is shown in FIG. 3.

The high-pass filter-and-amplifier 11 filters the video frequency with a bandwidth characteristic inverse to a low-pass characteristic encountered by the video signal during its transmission or recording playback. The filtered video signal also is amplified and inverted. Postcorrection phase-and-gain restorer 12 restores a signal level to the inverted-filtered video signal. The output of the postcorrection phase-and-gain restorer 12 is the restored video signal.

The high-pass filter-and-amplifier 11 samples the high-frequency components of the video input and inverts the high-frequency components 180° out of phase, while amplifying them. Simultaneously, the identical video input is passed through a variable, wideband-video delay line 13 adjusted to the additive-inverted amplifier-signal output, delaying the entire video signal. The video signal is delayed by a half-cycle, or more, of a subcarrier frequency.

Both signals are then fed, respectively, to a postcorrection phase-and-gain restorer 12 and to a precorrection phase-and-gain restorer 141 both of which are adjusted to correct the leading and lagging edges of the high-frequency components. Using a portion of the shape of the standard synchronization tip of the original video signal as a reference, postcorrection phase-and-gain restorer 12 and precorrection phase-and-gain restorer 14 drive the combining network 15 to adjust the signal from the high-pass filter-and-amplifier 11 for composite symmetry, and adjust the signal from the wideband-video delay line 13 to correct the tilt of the low-frequency components. Thus, the non-delayed signal pre-phases the delayed signal, forming a corrected-composite signal.

The information in the delay line is adjusted to delay the composite information by one-half cycle, or more, of 3.579545 MHz for NTSC systems, so that when the wideband inverted-amplified information is added back to the composite-delayed information, the information in the wideband inverted-amplified signal is in phase, i.e., additive, with the 3.579545 MHz components of the composite-delayed information.

Figure 4:
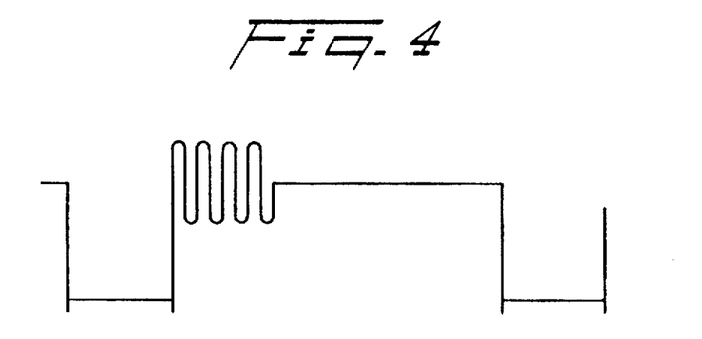
FIG. 4 is a drawing of a corrected waveform.

The combining network 15 combines the restored video signal from the postcorrection phase-and-gain restorer 12 and the delayed video signal from the precorrection phase-and-gain restorer 14, to generate the composite video signal. The composite video signal has a corrected waveform as shown in FIG. 4.

The corrected-composite video signal is then passed through a voltage amplifier 16 to restore the video amplitude of the composite-video information, then passed through a low-impedance amplifier 17 to maintain the integrity of the correction, then to a push-pull low-impedance output-video amplifier 19 which evaluates the signal and interacts with a black-stretch and synchronization shaper 18 which adds back amplitude to the synchronization tip and gamma corrects the video information in the black areas for restored video output.

The voltage amplifier 16 amplifies the composite video signal from the combining network 15. The low-impedance amplifier 17 matches impedances of the amplified-composite video signal from the voltage amplifier 16. The output-video amplifier 19 further amplifies the signal from the low-impedance amplifier 17.

To further automate the image processor to effect real-time compensation for response time and group delays, a white signal may be used. A full-white signal of fixed duration is inserted at a line position of the vertical-blanking interval. This white signal will have a known duration, a known horizontal dot-clock position and a known vertical-line position. The image processor will start a time measurement at the precise line-and-dot-clock position defined. Four time measurements are made based on the white signal.

The first measurement, start time, begins at the dot-clock position and runs to the point that the leading edge of the white signal crosses a fixed-reference point at 10% of full scale of the transition level. The second measurement, rise time, determines the time required for the leading edge to rise to a second fixed-reference point at 90% of full scale of the transition level. The third measurement, duration, is the period of time which the white signal exists above the 90% fixed-reference point from the leading edge to the trailing edge of the signal. The fourth measurement, fall time, is the time required for the white signal to fall from the 90% level back to the 10% level on the trailing edge. These measurements may be used to help correct for the group delay and system response.

Figure 5:
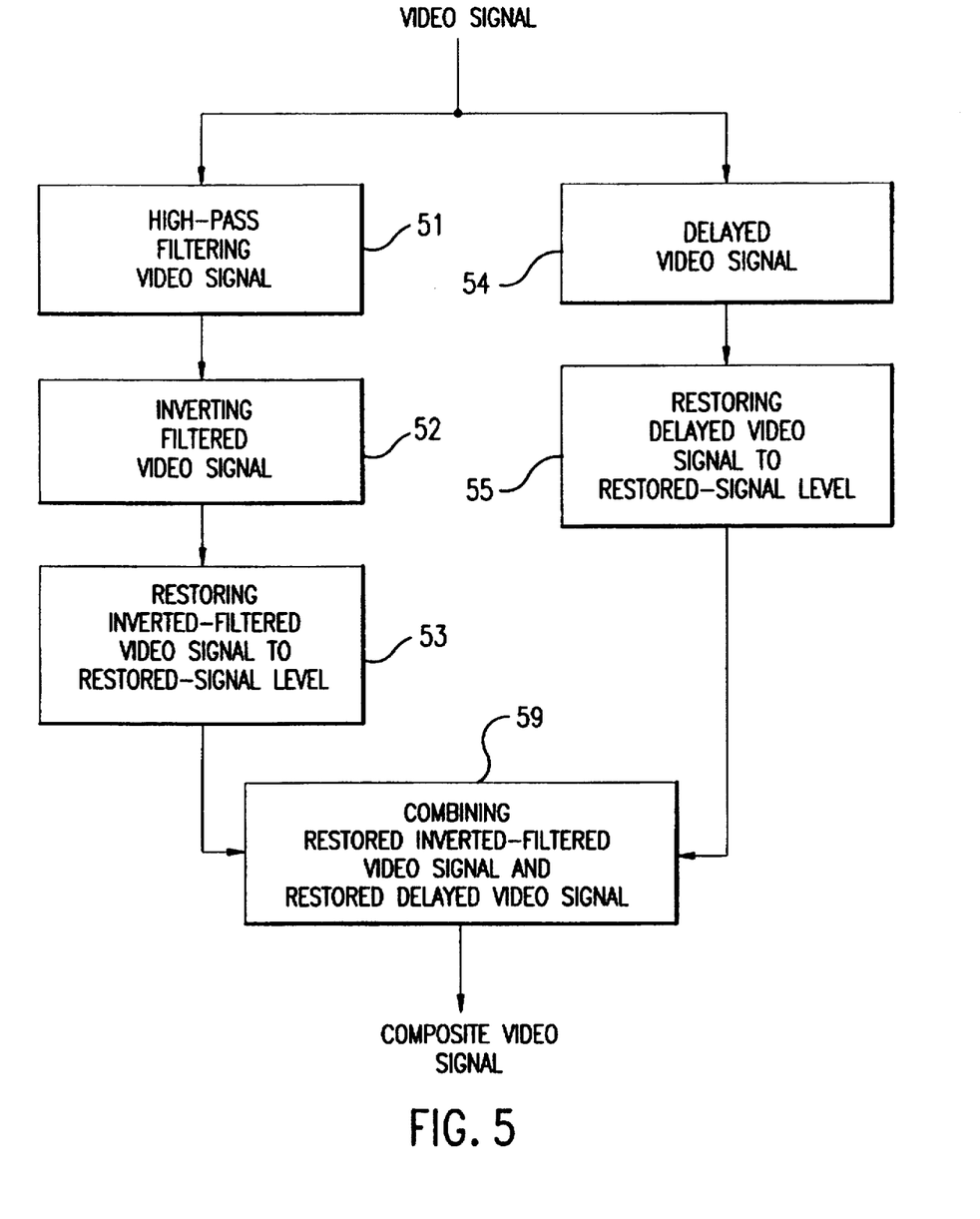
FIG. 5 is a flowchart of the method of the initial-video processor.

The present invention also includes a method, using the initial-video processor, for compensating for accumulated phase-and-gain errors encountered during transmission of the video signal over the transmission channel. The method, as shown in FIG. 5, includes the steps of high-pass filtering 51 the video signal with a bandwidth characteristic inverse to a low-pass characteristic encountered during transmission of the video signal. The steps further include inverting 52 the filtered video signal to generate an inverted-filtered video signal. Also, the video signal is delayed 54 by at least a half-cycle. The delayed video signal and the inverted-filtered video signal are combined 59 to generate a composite video signal.

The method may further include the steps of restoring 53 the inverted-filtered video signal to a restored-signal level, and restoring 55 the delayed video signal to the restored-signal level. The restored inverted-filtered video signal and the restored delayed video signal, which both have a signal level approximately equal to the restored-signal level, are then combined 59 to generate the composite video signal.

The Digital Processor

The digital-processing means reshapes or reprocesses the composite video signal to re-establish PAL, NTSC, SECAM or other world-wide broadcast standard with time-base correction. As illustratively shown in FIG. 6, the digital processor 75 includes the input-video processor 63, the feature-video processor 64, the frame buffer 76, the RGB-output processor 65, the output-video processor 69, and the control processor 72. The control processor 72 may receive input from a switch input 73 and/or from a computer input 74. The outputs from the RGB-output processor 65 may be filtered to produce red video output 66, green video output 67, and blue video output 68. The RGB-output processor also outputs digital RGB signals to the output-video processor 69 which encodes RGB into an analog composite video signal 70 and an analog component video signal 71. The input-video processor 63 of the digital processor 75 is connected to the output of the initial-video processor 62.

Input-Video Processor

The input-video processor converts analog chrominance, luminance or composite inputs, as well as digital-component inputs, through analog-to-digital converters to generate digital signals. The input-video processor receives the composite video signal output by the initial-video processor and converts the composite video signal to a digital signal to generate digital-component signal information. The input-video processor digitizes the information to feed the video-output stages, whether composite, component, or RGB, in 8-bit code. The code may be generated in 10-bit or 12-bit sequences, or any other format known in the art.

The input-video processor in the preferred embodiment includes a plurality of video-input analog-to-digital converters, a digital decoder, a digital encoder, and a clock generator.

Feature-Video Processor

The feature-video processor receives the digital-component signal-information output from the input-video processor and processes the digital-component signal information for video-information enhancement. The feature-video processor may be used to contour video information, reduce noise in the video information, bandpass-equalize the video information using a plurality of filters, and/or encode 4:2:2, 4:1:1, or 8:4:4 PAL or NTSC standards to generate processed component video information.

Frame Buffer

Video-memory means is embodied as a frame buffer. The video memory means could also be embodied as a video random-access memory (RAM), an EEPROM, or any other equivalent memory device or combination of memory devices, as is well known in the art. The frame buffer receives the processed component video information and stores a single frame of video during processing for retiming the video frame. The frame buffer also re-establishes NTSC, PAL, SECAM or other selected broadcast timing standards in the processed component video information to generate time-base corrected digital signal information. The frame buffer is a continuation of the input-video processor with respect to time-base correction.

RGB-Output Processor

The RGB-output processor converts the time-base corrected digital information to an analog format such as RGB for direct output. Through the use of a plurality of video-output filters, the RGB-output processor also generates digital RGB-video output to the output-video processor.

Output-Video Processor

The primary function of the output-video processor is to reconstruct the digital RGB-signal from the RGB-output processor into an analog-signal format. The output-video processor re-encodes RGB into analog-composite video and/or analog-component video. In the preferred embodiment the output-video processor includes a digital-to-analog converter, a digital-video encoder, a digital-space converter, an analog-input analog-to-digital converter for genlock, and a clock generator.

The output-video processor can also add chrominance enhancement. For RGB format, for example, a look-up table (LUT) may be used by the output-video processor in place of an analog-to-digital converter. Values in the LUT may be modified by the control processor, directly by the user, or using any other technique. Once these signals are stored, they can be reset in the various processors.

The output-video processor also has a series of analog filters to enhance an edge or roll off an edge and to compensate for distortion caused by broadcast equipment.

Control Processor

The control processor provides controlling and monitoring functions. The control processor addresses the input-video processor, the feature-video processor, and the output-video processor, and can send messages monitoring the on-line status of these processors. The control processor can embed information in the vertical-blanking interval to send control information to the feature-video processor or to a downlink.

The control processor also determines the parameters that are used by the input-video processor, the feature-video processor, and the output-video processor, and may update these parameters in response to switch inputs or to an external computer. The parameters may representatively include burst phase, chroma levels, picture sharpness, noise reduction, and adjustments to the plurality of filters used to bandpass-equalize the video information. The parameters can be checked by looking at the display screen, a vector scope, or other device.

The control processor includes a control-processor memory and an EEPROM. A set of default parameters is stored in the control-processor memory. The control-processor memory is a hard-coded memory that can only be changed by replacement of the control processor with a new control processor having new default parameters. The EEPROM is used to store a changeable set of the same parameters.

The set of parameters stored in the EEPROM is verified using a warm-start pattern; the warm-start pattern may be stored in the EEPROM or on a disk in a remote computer. At power up or upon reset, the EEPROM warm-start pattern is read. If the pattern is valid, then the parameter set stored in the EEPROM is loaded into the input-video processor, the feature-video processor, and the output-video processor. If the warm-start pattern is not valid, then the parameter set hard-coded into the control-processor memory is used by the input-video processor, the feature-video processor, and the output-video processor. The warm-start pattern, which is set up by the EEPROM, allows the control processor to operate in a stand-alone default mode on power-up when there are no other switch or computer inputs to provide parameter information.

Figure 6:
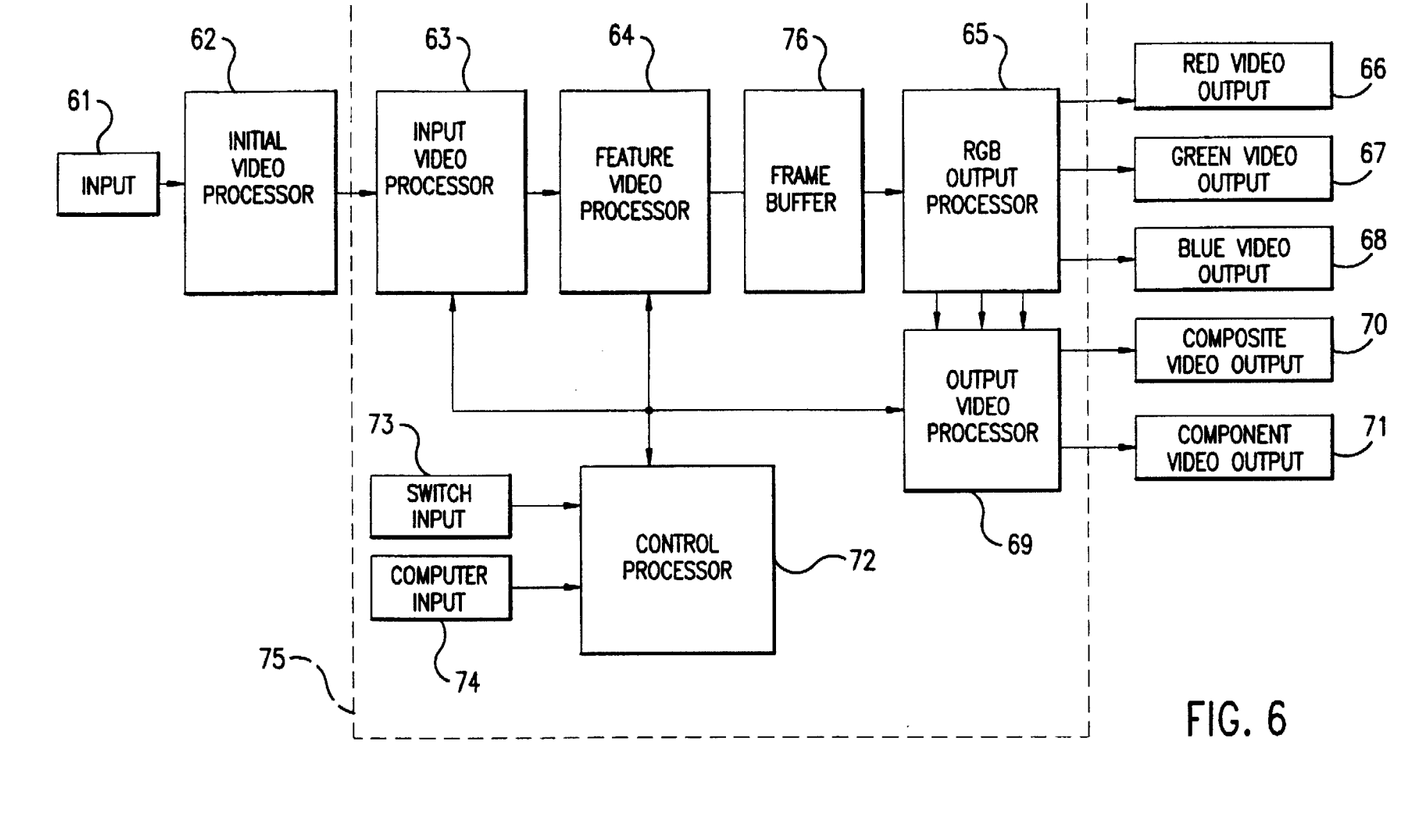
FIG. 6 is a block diagram of the image-processor system of the present invention indicating the input-and-output paths.
Figure 7:
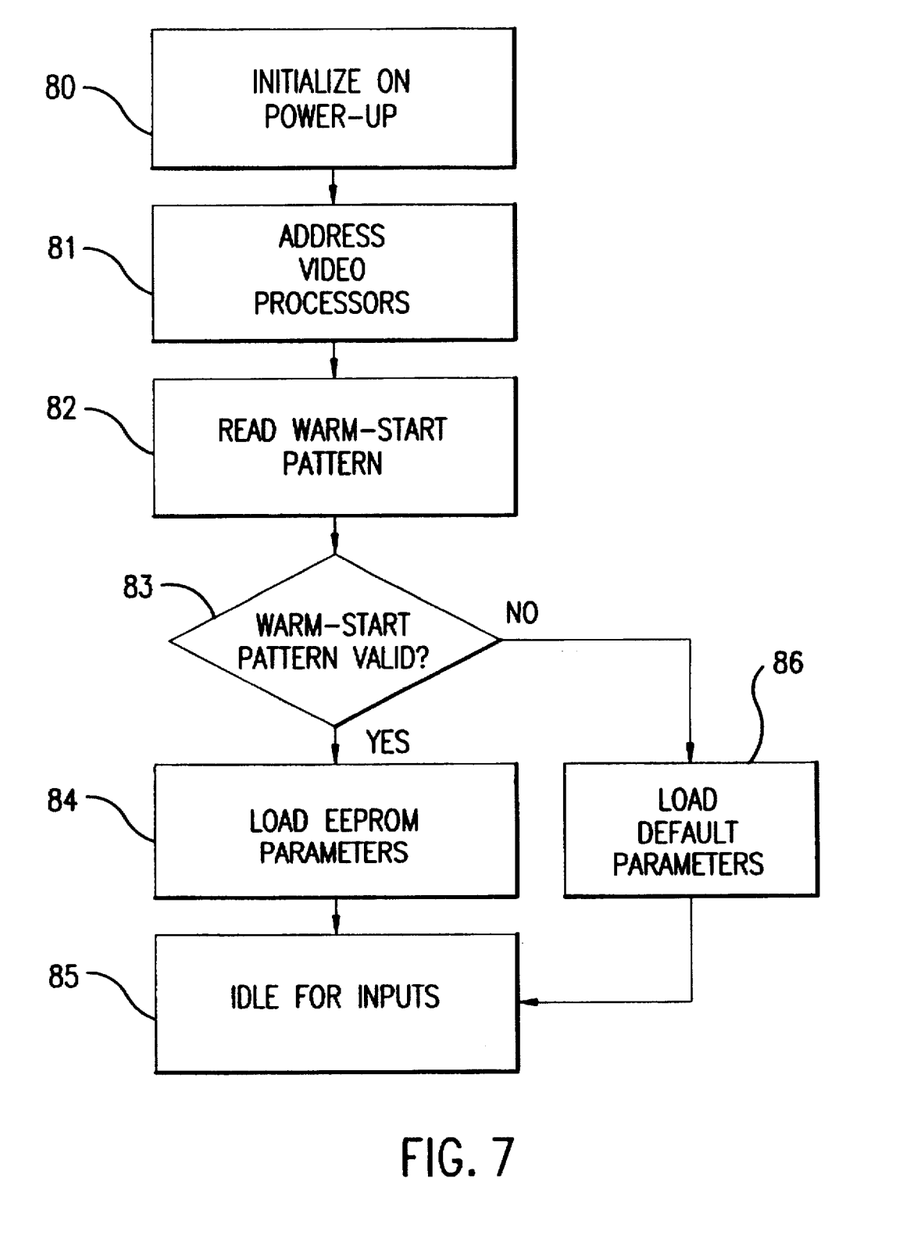
FIG. 7 is a block diagram of the microprocessor-controller software on a power-up initialization.

As shown in FIG. 7, upon power-up or reset the control processor initializes 80 the digital processor. Initialization includes loading the default set of parameters stored in the control-processor memory. If there are no inputs from the digital switch input 73 (FIG. 6) or from the computer input 74 (FIG. 6), then the control processor addresses 81 the input-video processor, the feature-video processor, and the output-video processor. The control processor then reads 82 the warm-start pattern stored in the EEPROM or stored on disk in a remote computer. If the warm-start pattern is valid 83, then the control processor loads 84 the set of parameters stored in the EEPROM or in the remote computer into the input-video processor, the feature-video processor, and the output-video processor. The control processor then idles 85 for inputs. If the warm-start pattern is not valid 83, then the default parameters are loaded 86 and the control processor idles 85 for inputs.

A warm-start pattern is used to verify the validity of a program or a set of parameters stored in the EEPROM or on a disk in a remote computer. The storage pattern is typically a byte (eight bits) of data. With eight bits, there are 256 possible combinations. A bit pattern of 10100101 is read as 0xA5 or as A5 hexadecimal. The probability of the exact pattern existing in a fixed memory location by accident is at least 1 in 256. Writing a fixed pattern to multiple-byte locations increases the probability by 2 to-the-power-of bit locations. Using four consecutive bytes for a total of 32 bits, or 2 to-the-32nd power, equates to 4,294,967,296 possible combinations.

By writing a known bit pattern to four consecutive bytes in the EEPROM each time the stored parameters are updated, the validity of the parameters may be verified on the next start up. On power up or upon reset, the four bytes of data are read and each byte is compared with a hard-coded pattern. If all four bytes match, the stored parameters are valid and are loaded into the input-video processor, the feature-video processor, and the output-video processor. If all four bytes do not match, the controller processor instructs the input-video processor, the feature-video processor, and the output-video processor to proceed with the default set of parameters hard-coded in the control-processor memory.

Figure 8:
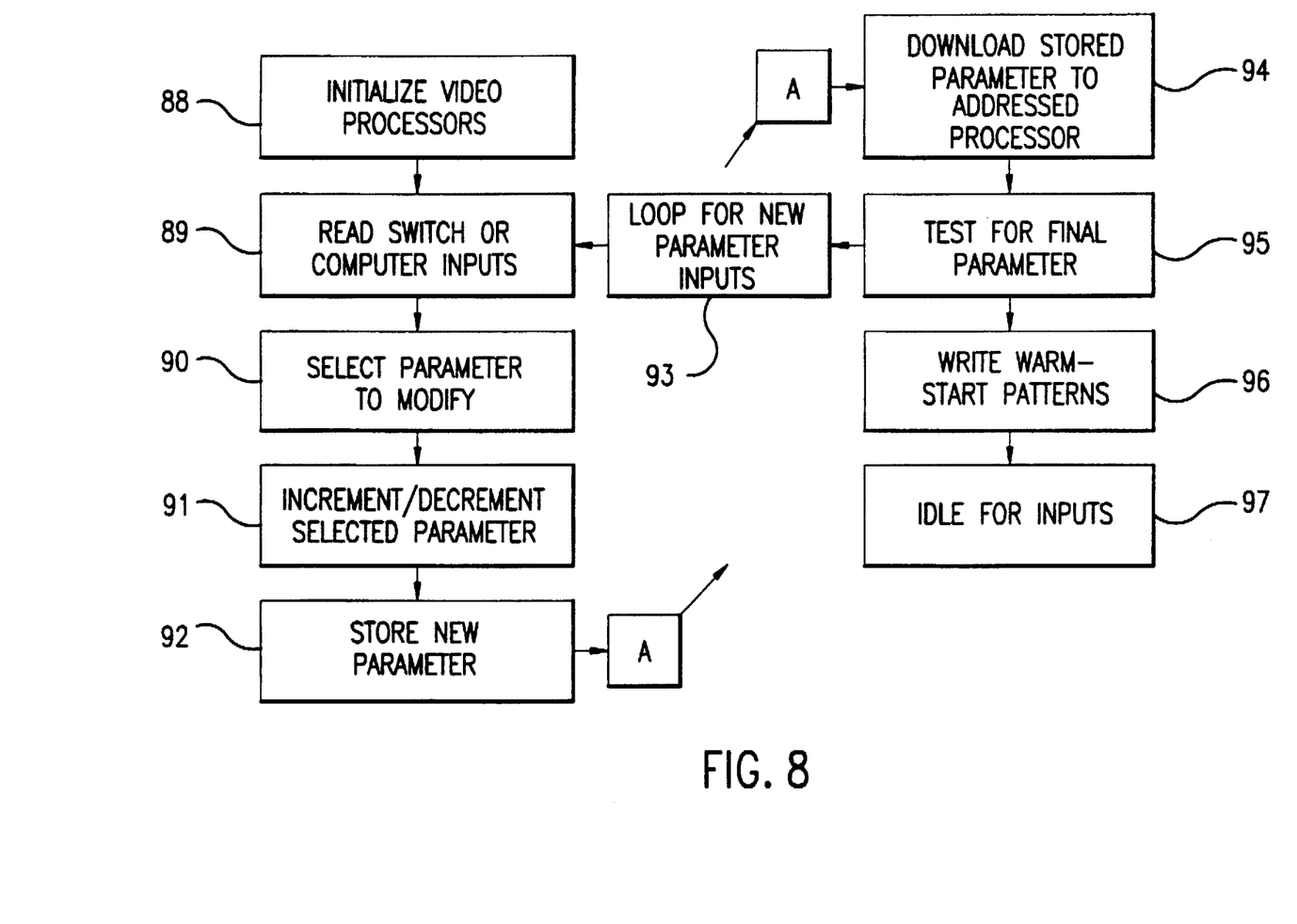
FIG. 8 is a block diagram of the software for modifying the video-processor parameters either in real time through switch inputs or via a software download from an external computer.

The present invention also includes a method for implementing front-panel adjustments to the parameters. The parameters may representatively include burst phase, chroma levels, picture sharpness, noise reduction, and adjustments to the plurality of filters used to bandpass-equalize the video information. As shown in FIG. 8, when the control processor receives inputs from the switch 73 or the computer 74 (FIG. 6), the control processor initializes 88 the input-video processor, the feature-video processor, and the output-video processor and then reads 89 the switch or computer inputs. The control processor then selects 90 a parameter to modify and increments or decrements 91 the selected parameter. The new parameter is stored 92 in the EEPROM or the remote computer and then downloaded 94 to the addressed processor. The control processor then tests 95 for final parameters and may loop 93 for new parameter inputs. When the final parameters have been tested, the control processor writes 96 warm-start patterns to the EEPROM or the remote computer, and idles 97 for inputs.

In use, the control processor 72 controls the parameters used by the input-video processor, the feature-video processor, and the output-video processor in processing the digital-component signal information and re-establishing broadcast standards in the processed component video information. These parameters may have the default values stored in the control-processor memory or may have values input from the switch input 73 and/or the computer input 74. A user may control the switch input and the computer input to modify the parameter values in response to the nature and extent of video distortion as seen on a display screen or other user interface medium. This ability to interactively modify the parameters in response to actual signal-quality degradations enables the user, through the digital processor, to generate an improved-output signal better in quality than the video signal as originally transmitted.

Parameter values modified by the user may be stored in the EEPROM or in the external computer. The stored-parameter values may be reused by verification of the warm-start pattern written to the EEPROM or the external computer when the digital processor is used again at a later time.

Through adjustment of the code that controls the input-video processor, the feature-video processor, and the output-video processor, the quality of the video signal corrected by the initial-video processor 62 as a composite video signal may be enhanced. The ability to control the code responsible for driving the input-video processor, the feature-video processor, and the output-video processor enables the user to interactively improve the composite video signal in a way not possible in the prior art.

Figure 9:
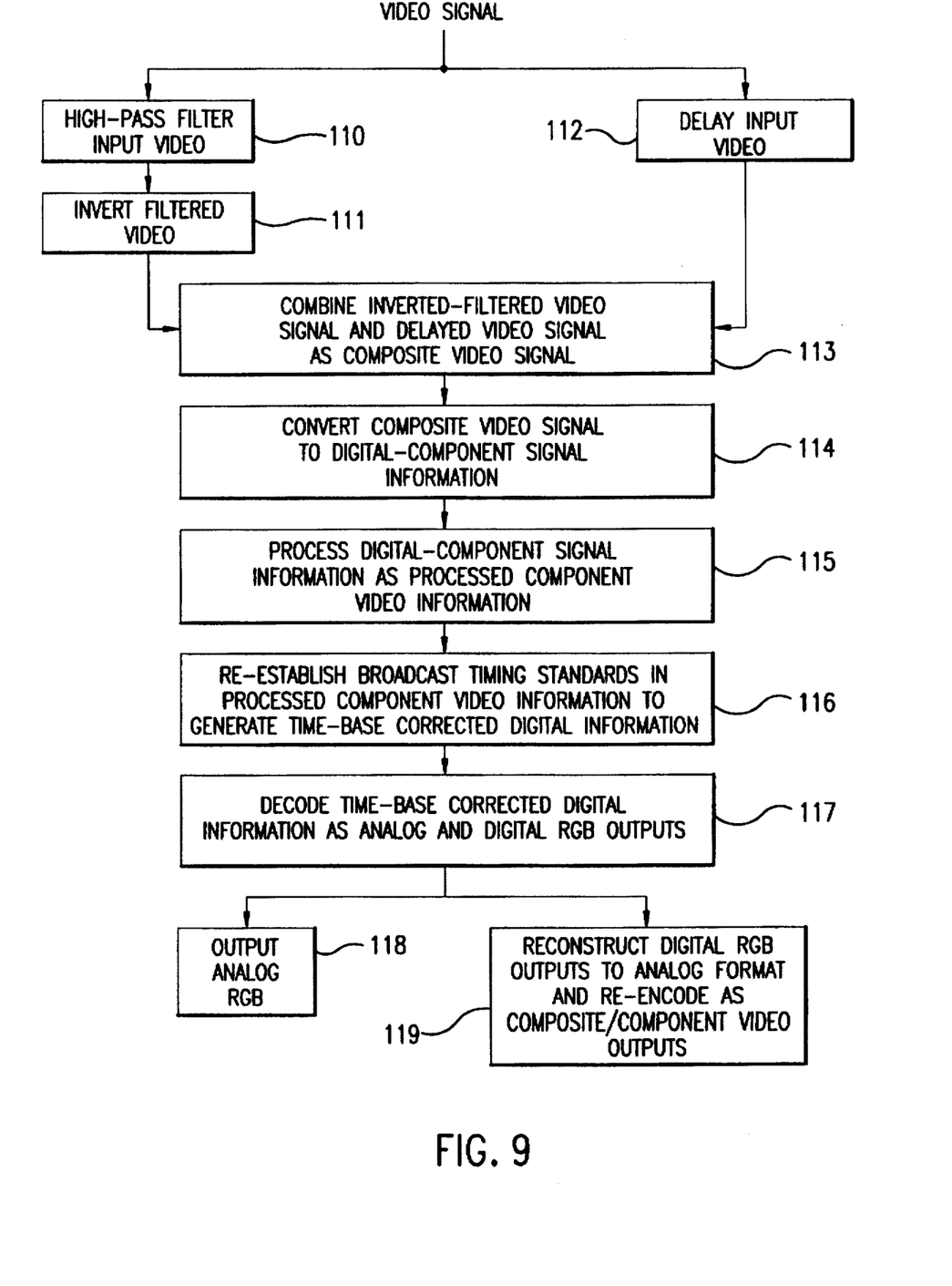
FIG. 9 is a flowchart of the method of the image-processor system.

In use of the method of improving a transmitted video signal as set forth in FIG. 9 using the image-processor system as shown in FIG. 6, a video signal is received through a video input 61 into the initial-video processor 62. The video signal may be distorted and degraded as the result of changes in the waveform occurring during transmission. The initial-video processor 62 normalizes the distorted video signal to correct for chrominance-group delays, luminance-group delays, and differential phase-and-gain incurred during recording and/or transmission of the video signal.

The initial-video processor normalizes the distorted video signal by high-pass filtering 110 the input video and inverting 111 the filtered video to generate an inverted-filtered video signal. The initial-video processor also delays 112 the input video by a half-cycle, or more, as a delayed video signal. The delayed video signal and the inverted-filtered video signal are combined 113 to generate a composite video signal.

The composite video signal is input to the input-video processor 63. The input-video processor converts 114 the composite video signal to a digital signal as digital-component signal information.

The digital-component signal information is input to the feature-video processor 64 and processed 115 to generate processed component video information. Processing 115 by the feature-video processor may include contouring the video information, reducing noise in the video information, bandpass-equalizing the video information, and encoding the video information with 4:2:2, 4:1:1, or 8:4:4 PAL or NTSC standards to generate processed component video information.

The processed component video information is input to the frame buffer. The frame buffer re-establishes 116 broadcast timing standards in the processed component video information to generate time-base corrected digital information.

The time-base corrected digital information is input to the RGB-output processor. The RGB-output processor decodes 117 the time-base corrected digital information to generate analog RGB outputs and digital RGB outputs.

The analog RGB outputs are output 118 directly. The digital RGB outputs are input to the output-video processor where the digital RGB outputs are reconstructed 119 to an analog format and re-encoded to generate analog composite or analog component video outputs from the digital processor.

It will be apparent to those skilled in the art that various modifications can be made to the image-processor system of the instant invention without departing from the scope or spirit of the invention, and it is intended that the present invention cover modifications and variations of the image-processor system provided they come within the scope of the appended claims and their equivalents.

I claim:

1. An image-processor system, having a video input and a video output, for compensating accumulated phase-and-gain errors incurred during transmission of a video signal over a communications channel and resulting in a distorted video signal, and for outputting a corrected, broadcast-standard video signal, comprising:

an initial-video processor, coupled to said input, for normalizing the distorted video signal and generating a composite video signal; and a digital processor including, an input-video processor, coupled to said initial-video processor, for converting the composite video signal into a digital-component signal information;

a feature-video processor, coupled to said input-video processor, for processing the digital-component signal information as processed component video information;

a frame buffer, coupled to said feature-video processor, for re-establishing broadcast timing standards in the processed component video information to generate time-base corrected digital information;

an RGB-output processor, coupled to said frame buffer, for decoding the time-base corrected digital information to generate analog RGB outputs for direct output and to generate digital RGB outputs;

an output-video processor, coupled to said RGB-output processor and to said video output, for reconstructing the digital-RGB outputs into an analog-composite video-signal format and an analog-component video-signal format; and a control processor, coupled to said input-video processor, said feature-video processor, and said output-video processor, for initializing and updating a set of parameters used to process the distorted video signal.

2. The image-processor system as set forth in claim 1, further comprising a switch input, coupled to said control processor, for inputting values for the set of parameters, the set of parameters including at least two of burst phase, chroma levels, picture sharpness, noise, and brightness and contrast adjustments.

3. The image-processor system as set forth in claim 1, further comprising an external-computer input, coupled to said control processor, for inputting values for the set of parameters, the set of parameters including at least two of, burst phase, chroma levels, picture sharpness, noise, and brightness and contrast adjustments.

4. An image-processor system for compensating for accumulated phase-and-gain errors incurred during transmission of a video signal over a communications channel and resulting in a distorted video signal, and for generating a corrected, broadcast-standard video signal, comprising:

an initial-video processor having a video input and a video output, said initial-video processor including, a high-pass filter and inverting amplifier, coupled to said input, for filtering and inverting the distorted video signal received at the input as an inverted-filtered video signal;

a postcorrection phase-and-gain restorer, coupled to said high-pass filter and inverting amplifier, for restoring a signal level of the inverted-filtered video signal as a restored inverted-filtered video signal;

a wideband-video delay line, coupled to said input, for delaying the distorted video signal as a delayed video signal;

a precorrection phase-and-gain restorer, coupled to said wideband-video delay line, for restoring the delayed video signal as a restored-delayed video signal; and a combining network, coupled to said video output, to said postcorrection phase-and-gain restorer, and to said precorrection phase-and-gain restorer, for combining the restored inverted-filtered video signal and the restored-delayed video signal, and outputting a composite video signal to said video output; and a digital processor, coupled to the output of the initial-video processor, said digital processor including, an input-video processor, coupled to the output of said initial-video processor, for converting the composite video signal into digital-component signal information;

a feature-video processor, coupled to said input-video processor, for processing the digital-component signal information to generate processed component video information;

a frame buffer, coupled to said feature-video processor, for re-establishing broadcast timing standards in the processed component video information to generate time-base corrected digital information;

an RGB-output processor, coupled to said frame buffer, for decoding the time-base corrected digital information to generate analog RGB outputs for direct output and to generate digital RGB outputs; and an output-video processor, coupled to said RGB-output processor, for reconstructing the digital RGB outputs into an analog-composite video-signal format and an analog-component video-signal format.

5. The image-processor system as set forth in claim 4 with said high-pass filter and inverting amplifier including a class A amplifier biased in a linear region of a characteristic curve of said class A amplifier.

6. The image-processor system as set forth in claim 4 with said wideband-video delay line delaying said video signal by at least a half-cycle at a subcarrier frequency.

7. The image-processor system as set forth in claim 4 with said precorrection phase-and-gain restorer including an amplifier having a gain of one for buffering the delayed video signal.

8. The image-processor system as set forth in claim 4 with said combining network including a resistor network for combining the restored inverted video signal and the restored-delayed video signal to generate the composite video signal.

9. The image-processor system as set forth in claim 4 further comprising:

a control processor, coupled to said input-video processor, said feature-video processor, and said output-video processor, for initializing and updating a set of parameters used to process the composite video signal.

10. The image-processor system as set forth in claim 9, further comprising a switch input, coupled to said control processor, for inputting values for the set of parameters, the set of parameters including at least two of burst phase, chroma levels, picture sharpness, noise, and brightness and contrast adjustments.

11. The image-processor system as set forth in claim 9, further comprising an input, coupled to said control processor, for inputting values for the set of parameters, the set of parameters including at least two of burst phase, chroma levels, picture sharpness, noise, and brightness and contrast adjustments.

12. An image-processor system for compensating accumulated phase-and-gain errors of a distorted video signal, comprising:

an initial-video processor having a video input and a video output, said initial-video processor including,
high-pass filter-and-amplifier means, coupled to said input, having a bandwidth characteristic inverse to a low-pass characteristic encountered during transmission of the video signal over the communications channel, for filtering the video signal as a filtered video signal and for inverting the filtered video signal as an inverted-filtered video signal;
postcorrection phase-and-gain restorer means for restoring the inverted-filtered video signal to a restored signal level, thereby generating a restored inverted-filtered video signal;
delay means, coupled to said input, for delaying the video signal as a delayed video signal;
precorrection phase-and-gain restorer means, coupled to said delay means, for restoring the delayed video signal as a restored-delayed video signal;
combiner means for combining the restored inverted-filtered video signal and the restored-delayed video signal to generate a composite video signal at said video output; and digital-processing means, coupled to said video output, for digitizing the composite video signal as digital-component signal information, for re-establishing timing broadcast standards in the digital-component signal information, and for reconstructing the digital-component signal information into an analog format.

13. The image-processor system as set forth in claim 12, said digital-processing means comprising:

an input-video processor, coupled to said initial-video processor, for converting the composite video signal into a digital-component signal information;

a feature-video processor, coupled to said input-video processor, for processing the digital-component signal information as processed component video information;

a frame buffer, coupled to said feature-video processor, for re-establishing broadcast timing standards in the processed component video information, to generate time-base corrected digital information;

an RGB-output processor, coupled to said frame buffer, for decoding the time-base corrected digital information to generate analog-RGB output for direct output and to generate digital-RGB output;

an output-video processor, coupled to said RGB-output processor and to said video output, for reconstructing the digital-RGB output into at least one of an analog-composite video-signal format and an analog-component video-signal format; and a control processor, coupled to said input-video processor, said feature-video processor, and said output-video processor, for initializing and updating a set of parameters used by said input-video processor, said feature-video processor, and said output-video processor in processing the composite video signal.

14. The image-processor system as set forth in claim 13, further comprising a switch input, coupled to said control processor, for inputting values for the set of parameters, the set of parameters including at least two of burst phase, chroma levels, picture sharpness, noise, and brightness and contrast adjustments.

15. The image-processor system as set forth in claim 13, further comprising an external-computer input, coupled to said control processor, for inputting values for the set of parameters, the set of parameters including at least two of burst amplitude, burst phase, chroma levels, picture sharpness, noise, and brightness and contrast adjustments.

16. The image-processor system as set forth in claim 12 or 13, with said postcorrection phase-and-gain restorer means including means for variably adjusting the inverted-filtered video signal to the restored-signal level.

17. The image-processor system as set forth in claim 12 or 13, with said high-pass filter-and-amplifier means including a class A amplifier biased in a linear region of a characteristic curve of said class A amplifier.

18. The image-processor system as set forth in claim 12 or 13, with said delay means delaying said video signal by at least a half-cycle at a subcarrier frequency.

19. The image-processor system as set forth in claim 12 or 13, with said precorrection phase-and-gain restorer means including an amplifier having a gain of one for buffering the delayed video signal.

20. The image-processor system as set forth in claim 12 or 13 with said combiner means including a resistor network for combining the restored inverted-filtered video signal and the restored delayed video signal to generate the composite video signal.

21. A method of correcting distortion errors incurred during transmission of a video signal, comprising the steps of:

filtering the video signal with a bandwidth characteristic inverse to a low-pass effect encountered during transmission of the video signal;

inverting the filtered video signal, thereby generating an inverted-filtered video signal;

delaying the video signal by an odd-integer multiple of at least a half-cycle at a subcarrier frequency, thereby generating a delayed video signal;

combining the inverted-filtered video signal and the delayed video signal to generate a composite video signal;

converting the composite video signal into digital-component signal information;

processing the digital-component signal information as processed component video information;

re-establishing broadcast timing standards in the processed component video information to generate time-base corrected digital information;

decoding the time-base corrected digital information to generate analog-RGB information and digital-RGB information; and reconstructing the digital-RGB output into at least one of an analog-composite video-signal format and an analog-component video-signal format.

22. The method as set forth in claim 21, the step of processing further including the steps of:

contouring video information;

reducing noise in the video information; and bandpass-equalizing the video information.

23. The method as set forth in claim 21 further including the steps of:

adjusting the inverted-filtered video signal to a restored-signal level; and adjusting the delayed video signal to a restored-signal level.

* * * * *